United States Patent [19]

Bastian

[11] 4,073,576
[45] Feb. 14, 1978

[54] DEVICE FOR CHOPPING AN OPTICAL BEAM

[75] Inventor: Robert Edward Bastian, Wyckoff, N.J.

[73] Assignee: North American Philips Corporation, New York, N.Y.

[21] Appl. No.: 718,869

[22] Filed: Aug. 30, 1976

[51] Int. Cl.² .................................................. G05D 25/00
[52] U.S. Cl. ....................................................... 350/273
[58] Field of Search ............... 350/266, 269, 272–275; 250/232, 233

[56] References Cited

FOREIGN PATENT DOCUMENTS 422,371  4/1967  Switzerland ........................ 350/269

Primary Examiner—F. L. Evans
Attorney, Agent, or Firm—Frank R. Trifari; Henry I. Steckler

[57] ABSTRACT

A chopper blade has parallel edges and is rotatably mounted on two eccentric discs. As one disc is driven, the blade moves across an optical beam in parallel fashion. Elliptical drive gears can be used to achieve linear speed.

7 Claims, 3 Drawing Figures

DEVICE FOR CHOPPING AN OPTICAL BEAM

The present invention relates to optical choppers, and more particularly to those for use with pyroelectric target television camera tubes.

With pyroelectric camera tubes, the target responds to changes in the object temperature. This requires that the tube either be in constant motion, or the incoming signal be "chopped" (periodically interrupted) to obtain an electrical output signal for display, since the tube does not provide an output signal form constant temperature stationary objects. Moving the tube, such as by a back and forth panning action, is obviously akward. Chopping the light beam also has problems. In particular, the chopping blade must chop parallel to the horizontal scanning lines in accordance with the vertical scan, or otherwise an irregular signal, or even no signal can result. To approximate this, prior art choppers used a very large disc with holes cut into it. Because of the largeness of the disc the chopping action was nearly parallel to the scanning lines, but a large amount of space was required. Also because of the constant angular speed of the disc, the linear chopping speed of the disc with respect to the target is variable.

It is therefore an object of the present invention to provide a chopper and a method for chopping that chops parallel to the horizontal scanning lines.

It is another object to provide a chopper that is compact.

It is still a further object to provide one with constant linear chopper blade speed.

In brief, these and other objects are achieved by having a chopper blade with parallel edges and means for moving the blade so that the edges always remain parallel to themselves. Thus the light beam is chopped parallel to the horizontal scanning lines. Elliptical drive gears ensure that the linear blade edge speed is a constant.

These and other objects, features, and advantages will become apparent from the description when taken in conjunction with the accompanying drawings in which.

Figure 1:
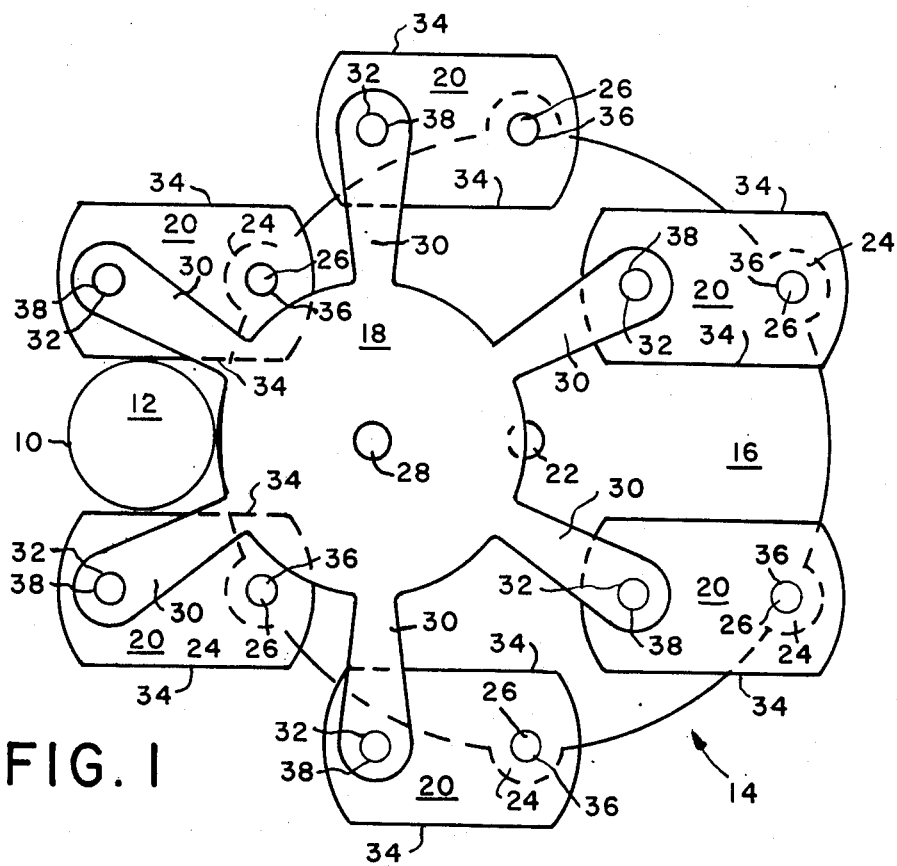
FIG. 1 is a front view of a chopper in accordance with the present invention.
Figure 2:
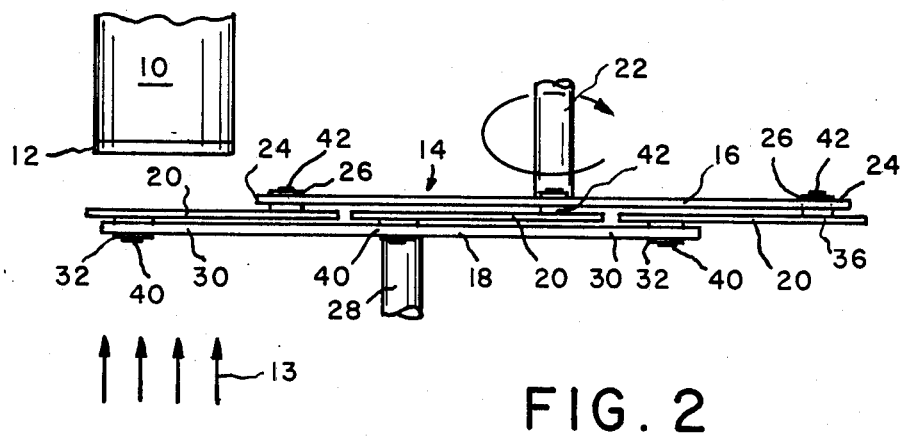
FIG. 2 is a top view of the same.

FIGS. 1 and 2 show a television camera tube 10 having a target 12. Light 13 from an object being viewed (not shown) impinges on the target 12. A chopper 14 in accordance with the present invention is positioned in front of tube 10 and, in particular, in front of target 12 in the path of light beam 13. In general, chopper 14 comprises a generally circular primary disc 16, a spoked secondary disc 18, and generally rectangular chopper blades 20 rotatably mounted therebetween. Primary disc 16 is centrally mounted on a drive shaft 22 and has a plurality of lugs 24 disposed about its perifery. In turn lugs 24 each have holes 26 therein. Secondary disc 18 is mounted on an idler shaft 28 that is eccentric with respect to drive shaft 22, i.e. their centers are displaced with respect to one another. It will be appreciated that shafts 22 and 28 are supported by bearings in some kind of frame, which is not shown for the sake of clarity. Secondary disc 18 has a plurality of radially and outwardly extending spokes 30, each of which has a hole 32 near its end. Chopper blades 20 are approximately rectangular in shape, and in particular, each has a pair of straight parallel edges 34, and a pair of holes 36 and 38.

Pivots 40 best shown in FIG. 2 go through the holes 32 and 38, while pivots 42 go through the holes 26 and 36, thus rotatably securing blades 20 to the discs 18 and 16 respectively. Loose rivots can be used for pivots 40 and 42, but of course, nuts and bolts, or ball bearings and a shaft could be used instead of rivots.

In operation, drive is applied to drive shaft 22 by a motor (not shown), thereby rotating the primary disc 16. The chopper blades 20 act as linkages driving secondary disc 18 about idler shaft 28. The blades 20 themselves are automatically counter rotated with edges 34 always being parallel to themselves. Thus the light beam 13 is chopped. This is done in parallel with the horizontal scanning lines on target 12 because of the parallel edges 34 and the motion of blades 20.

Figure 3:
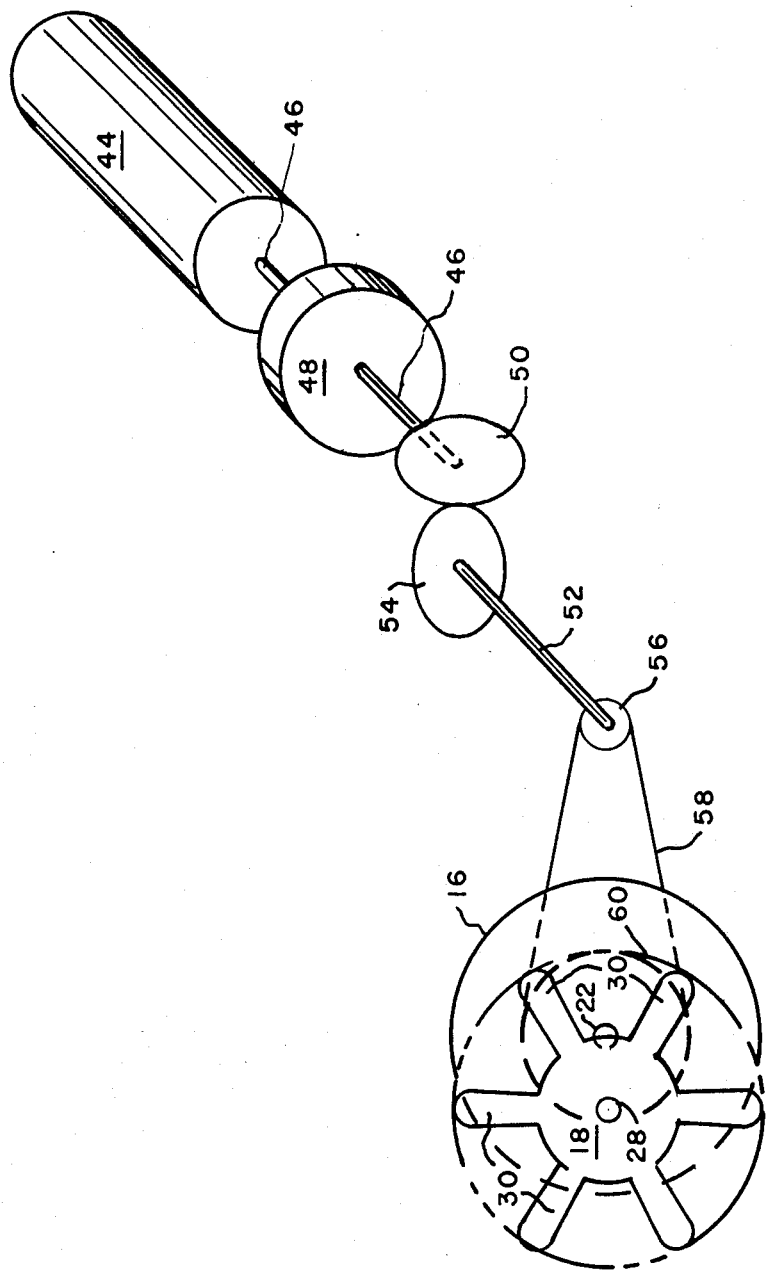
FIG. 3 is a view of the drive system.

If the angular speed of shaft 22 is a constant, then the linear speed of chopper blades 20 with respect to target 12 is a cosine function. This is adequate for some functions, but ideally the linear speed should be a constant. FIG. 3 shows a drive device for overcoming this problem.

A drive motor 44 drives a shaft 46 on which is mounted an inertial flywheel 48 and a first elliptical gear 50. Another shaft 52 has mounted on it at one end a second elliptical gear 54 in contact with the first gear 50 and at the other end a first pulley 56. A belt 58 couples first pulley 56 to a second pulley 60 mounted on shaft 22. Preferably, belt 58 is a timing belt that has ridges in it so as to ensure that synchronization is maintained. Chopper blades 20 and the supports for shafts 22, 28, 46, and 52 have been left out for the sake of clarity. It can be shown that such as drive device will impart a substantially linear motion to the blades 20 for constant angular speed of shaft 46. Since the load on shaft 46 is no longer a constant with rotation, the flywheel 48 smooths out this load variation and tends to keep its angular speed constant.

It will be appreciated that many other embodiments are possible without departing from the spirit and scope of the invention.

I claim:

1. A device for chopping an optical beam comprising at least one chopper blade having parallel edges, and means for moving said blade through said beam so that said edges always remain parallel to themselves through said beam, said blade moving means comprising a rotatably mounted primary disc, a secondary disc eccentrically rotatably mounted with respect to said primary disc and having at least one radially extending spoke extending therefrom, said chopper blade being rotatably mounted on both of said primary disc and said spoke.

2. A device as claimed in claim 1 wherein said secondary disc comprises a plurality of spokes, and further comprising a plurality of chopper blades rotatably mounted between said spokes respectively and said primary disc.

3. A device as claimed in claim 1 wherein said primary disc has a radius extending to less than the distance to said beam, said spoke extends to beyond said distance, and said blade is mounted proximate the end of said spoke.

4. A device as claimed in claim 1, wherein said blade moving means comprises means for moving said blade at a constant linear speed.

5. A device as claimed in claim 4, wherein said constant linear speed moving means comprises a pair of elliptical gears in contact with each other, one of said gears being coupled to said blade moving means.

6. A device as claimed in claim 1 wherein said blade moving means comprises a pair of elliptical gears in contact with each other, one of said gears being coupled to said primary disc.

7. A device as claimed in claim 6, further comprising a flywheel coupled to the remaining gear, whereby said remaining gear tends to rotate at constant angular speed.

* * * * *